US007377292B2

(12) United States Patent
Mori et al.

(10) Patent No.: US 7,377,292 B2
(45) Date of Patent: May 27, 2008

(54) VEHICULAR BRAKE SYSTEM COMPONENT

(75) Inventors: Mitsuo Mori, Yokohama (JP); Koichiro Yamada, Yokohama (JP); Hiroshi Mizukami, Yokohama (JP); Chiharu Umetu, Yokohama (JP); Kenichi Suzuki, Kariya (JP); Juichi Shibatani, Kariya (JP); Masaaki Kobayashi, Kariya (JP); Yutaka Kikuchi, Kita-Adachi-gun (JP); Kazuhiro Takahara, Kitaadachi-gun (JP); Tatsumi Ohishi, Kitaadachi-gun (JP)

(73) Assignees: NHK Spring Co., Ltd., Yokohama-shi (JP); ADVICS Co., Ltd., Kariya (JP); Kokoku Intech Co., Ltd., Tokyo (JP)

( * ) Notice: Subject to any disclaimer, the term of this patent is extended or adjusted under 35 U.S.C. 154(b) by 626 days.

(21) Appl. No.: 10/900,605

(22) Filed: Jul. 27, 2004

(65) Prior Publication Data
US 2005/0061379 A1    Mar. 24, 2005

(30) Foreign Application Priority Data
Jul. 30, 2003  (JP) .............................. 2003-282860
May 14, 2004  (JP) .............................. 2004-145048

(51) Int. Cl.
*F16L 55/04*    (2006.01)

(52) U.S. Cl. ........................... 138/30; 138/31; 138/26; 220/721; 303/87

(58) Field of Classification Search .................. 138/30, 138/31, DIG. 1; 428/465; 220/721, 720, 220/723; 303/87, 113.2, 1, 113.4
See application file for complete search history.

(56) References Cited

U.S. PATENT DOCUMENTS

| 4,997,009 | A  | * | 3/1991  | Niikura et al. ................. 138/30  |
| 5,042,781 | A  |   | 8/1991  | Ezure et al. |
| 5,409,041 | A  | * | 4/1995  | Yoshida et al. ................ 138/30 |
| 5,524,671 | A  | * | 6/1996  | Yoshida et al. ................ 138/30 |
| 5,618,629 | A  | * | 4/1997  | Takamatsu et al. ....... 428/475.5 |
| 5,771,936 | A  | * | 6/1998  | Sasaki et al. ................. 138/31 |
| 5,868,168 | A  | * | 2/1999  | Mott et al. ..................... 138/31 |
| 6,056,013 | A  | * | 5/2000  | Sasaki et al. ................. 138/31 |
| 6,286,552 | B1 | * | 9/2001  | Shimbori et al. ............. 138/31 |
| 6,494,545 | B2 | * | 12/2002 | Nakamura et al. ............ 303/87 |
| 6,789,576 | B2 | * | 9/2004  | Umetsu et al. ................ 138/30 |
| 6,805,166 | B2 | * | 10/2004 | Suzuki et al. ................. 138/31 |
| 6,810,915 | B2 | * | 11/2004 | Umetsu et al. ................ 138/30 |
| 6,871,670 | B2 | * | 3/2005  | Suzuki et al. ................. 138/30 |
| 6,871,672 | B2 | * | 3/2005  | Kurokawa et al. ............ 138/31 |
| 6,957,669 | B2 | * | 10/2005 | Suzuki et al. ................. 138/30 |

FOREIGN PATENT DOCUMENTS

| CN | 1431952 A      | 7/2003  |
| JP | 63-195102 U    | 12/1988 |
| JP | 6-1092 B2      | 1/1994  |
| WO | WO 03/052301 A1 | 6/2003  |

* cited by examiner

*Primary Examiner*—Patrick F. Brinson
(74) *Attorney, Agent, or Firm*—Frishauf, Holtz, Goodman & Chick, P.C.

(57) ABSTRACT

A vehicular brake system component is used in a brake system of a vehicle. The brake system component includes a sealable bonded component having a metal member and an elastic rubber member bonded to each other and located so as to touch a brake fluid.

10 Claims, 4 Drawing Sheets

VEHICULAR BRAKE SYSTEM COMPONENT

CROSS-REFERENCE TO RELATED APPLICATIONS

This application is based upon and claims the benefit of priority from prior Japanese Patent Applications No. 2003-282860, filed Jul. 30, 2003; and No. 2004-145048, filed May 14, 2004, the entire contents of both of which are incorporated herein by reference.

BACKGROUND OF THE INVENTION

1. Field of the Invention

The present invention relates to a vehicular brake system component, such as an accumulator, used in a brake system of a vehicle.

2. Description of the Related Art

A known vehicular brake system component, e.g., an accumulator, comprises a pressure vessel and a diaphragm. The pressure vessel has a gas chamber in which a compressed gas is sealed and a liquid chamber filled with a liquid, such as oil. The diaphragm divides the gas and liquid chambers and has one end capable of extending and contracting in the axial direction of the vessel. The diaphragm of the accumulator of this type requires elasticity to cope with change in volume of the gas, as well as high gas barrier performance (high gas impermeability). Therefore, the diaphragm is expected to be flexible and highly durable.

In the case of the accumulator of which the interior of the pressure vessel is divided into the gas and liquid chambers by the diaphragm, however, the diaphragm sometimes may excessively extend or contract when the gas is sealed into the gas chamber or if the pressure in the liquid chamber falls below a given level during use. If the diaphragm excessively extends or contracts in this manner, it is partially pressed against the inner surface of the pressure vessel. Thus, an undue force may possibly locally act on a seal member provided on an elastic end of the diaphragm, thereby spoiling the sealing performance.

A known accumulator is described in Jpn. Pat. Appln. KOKOKU Publication No. 6-1092. In this accumulator, a partition wall is located in a liquid chamber, and a lid (seal member) is provided on an elastic end of a diaphragm. The partition wall has a circulation port in a position opposite the elastic end of the diaphragm. Oil in an oil chamber flows through the circulation port when the diaphragm extends or contracts with the port communicating with the oil chamber. The lid is formed of a rubberlike elastic body of synthetic resin.

When the diaphragm fully extends or contracts, according to this accumulator, some of oil that is previously stored in the liquid chamber is confined to the liquid chamber side of the diaphragm (between the partition wall and the diaphragm) by the lid. Since the liquid is substantially non-compressive, the diaphragm is prevented from further extending or contracting by the confined backup liquid or oil.

The seal member for confining the backup liquid is always immersed in a liquid that is introduced into the liquid chamber. The accumulator is used in a hydraulic-pressure device that is mounted in a vehicle, for example. Preferably, therefore, the seal member should be able to secure satisfactory sealing performance for a prolonged time, as well as chemical resistance and durability against pressure fluctuation at high temperature.

BRIEF SUMMARY OF THE INVENTION

A vehicular brake system component according to a first aspect of the invention is used in a vehicular brake system, and comprises a sealable bonded component having a metal member and an elastic rubber member bonded to each other and located so as to touch a brake fluid.

The vehicular brake system component according to the first aspect of the invention comprises the sealable bonded component having the metal member and the elastic rubber member bonded to each other and located so as to touch the brake fluid. Therefore, the sealing performance of the bonded component can be secured for a prolonged time.

Preferably, the bonded component has the metal member, an adhesive layer provided on the metal member so as to correspond to at least a part of the surface of the metal member, and the elastic rubber member bonded to the metal member with the adhesive layer therebetween. With this arrangement, the sealing performance of the bonded component can be secured for a prolonged time.

A vehicular brake system component according to a second aspect of the invention is a component such as an accumulator used in a brake system of a vehicle. The brake system component comprises: a pressure vessel having a gas chamber in which a gas is sealed and a liquid chamber filled with a liquid; a diaphragm which has a fixed end fixed to the pressure vessel and a free end capable of extending and contracting in the direction of an axis of the pressure vessel and is located in the pressure vessel to separate the gas chamber and the liquid chamber; a partition wall located in the liquid chamber and having a circulation port through which the liquid in the liquid chamber flows in or out when the diaphragm extends or contracts; and a seal member which closes the circulation port in a liquid-tight manner to confine the liquid between the partition wall and the diaphragm when the diaphragm extends or contracts to a given stroke. The seal member has a metal member, an adhesive layer provided on the metal member so as to correspond to at least a part of the surface of the metal member, and an elastic rubber member bonded to the metal member with the adhesive layer therebetween.

In the vehicular brake system component according to the second aspect of the invention, the seal member has the metal member, the adhesive layer provided on the metal member so as to correspond to at least a part of the surface of the metal member, and the elastic rubber member bonded to the metal member with the adhesive layer therebetween. Therefore, the sealing performance of the seal member can be secured for a prolonged time.

Preferably, the metal member has a metal member body and a protective film which is provided on the surface of the metal member body and restrains degradation of the metal member body. With this arrangement, the protective film restrains corrosion of the surface of the metal member body, so that oxidative degradation of the metal member and lowering of the adhesive function between the metal member and the elastic rubber member can be restrained for a prolonged time.

Preferably, the protective film is a zinc calcium phosphate film having a crystal grain size of 8 μm or less. With this arrangement, the peel strength at the interface between the metal member and the adhesive layer can be enhanced.

Preferably, the metal member and the elastic rubber member are bonded to each other by vulcanization bonding with use of the adhesive layer. With this arrangement, the metal member and the elastic rubber member can be bonded more firmly.

Preferably, the adhesive layer has a first adhesive layer in contact with the metal member and a second adhesive layer provided on the first adhesive layer. More specifically, the adhesive layer preferably has the first adhesive layer in contact with the metal member and the second adhesive layer provided on the first adhesive layer and in contact with the rubber member. With this arrangement, the metal member and the elastic rubber member can be bonded more firmly with the adhesive layer having the first and second adhesive layers between them.

Preferably, the first adhesive layer is set so that the weight ratio of a hydroxyl group therein is 10% or more. With this arrangement, the peel strength between the metal member and the adhesive layer can be enhanced by hydrogen bonds at the interface between the metal member and the adhesive layer.

Preferably, the first and second adhesive layers are set so that the weight ratios of chlorine and a sulfo group therein are 11.0% or less and 1.0% or less, respectively. With this arrangement, the sealing performance of the seal member or bonded component can be maintained for a prolonged time.

Preferably, the thickness of the first adhesive layer ranges from 1 µm to 15 µm, and the thickness of the second adhesive layer ranges from 4 µm to 21 µm. With this arrangement, the first and second adhesive layers can be spread individually uniformly. Besides, these adhesive layers themselves can be restrained from becoming fragile. Thus, satisfactory peel strength can be obtained between the metal member and the elastic rubber member, so that the sealing performance of the seal member or bonded component can be kept satisfactory for a prolonged time.

Preferably, the first adhesive layer is a phenol resin layer, and the second adhesive layer is a chlorinated EPDM resin layer. With this arrangement, the sealing performance of the seal member or bonded component can be kept satisfactory for a prolonged time.

Preferably, the elastic rubber member is formed of elastic rubber having a hardness of higher than SHORE A 80 as specified by JIS (Japanese Industrial Standard) K6253 and a tensile strength of 20 MPa or more. With this arrangement, the seal member or bonded component can maintain its satisfactory sealing performance for a prolonged time even if it is strained repeatedly.

According to the present invention, there may be provided a vehicular brake system component that can secure its sealing performance for a long period of time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

A first embodiment of the present invention will now be described with reference to FIGS. 1 and 2. In connection with the present embodiment, an accumulator will be explained as a vehicular brake system component.

Figure 1:
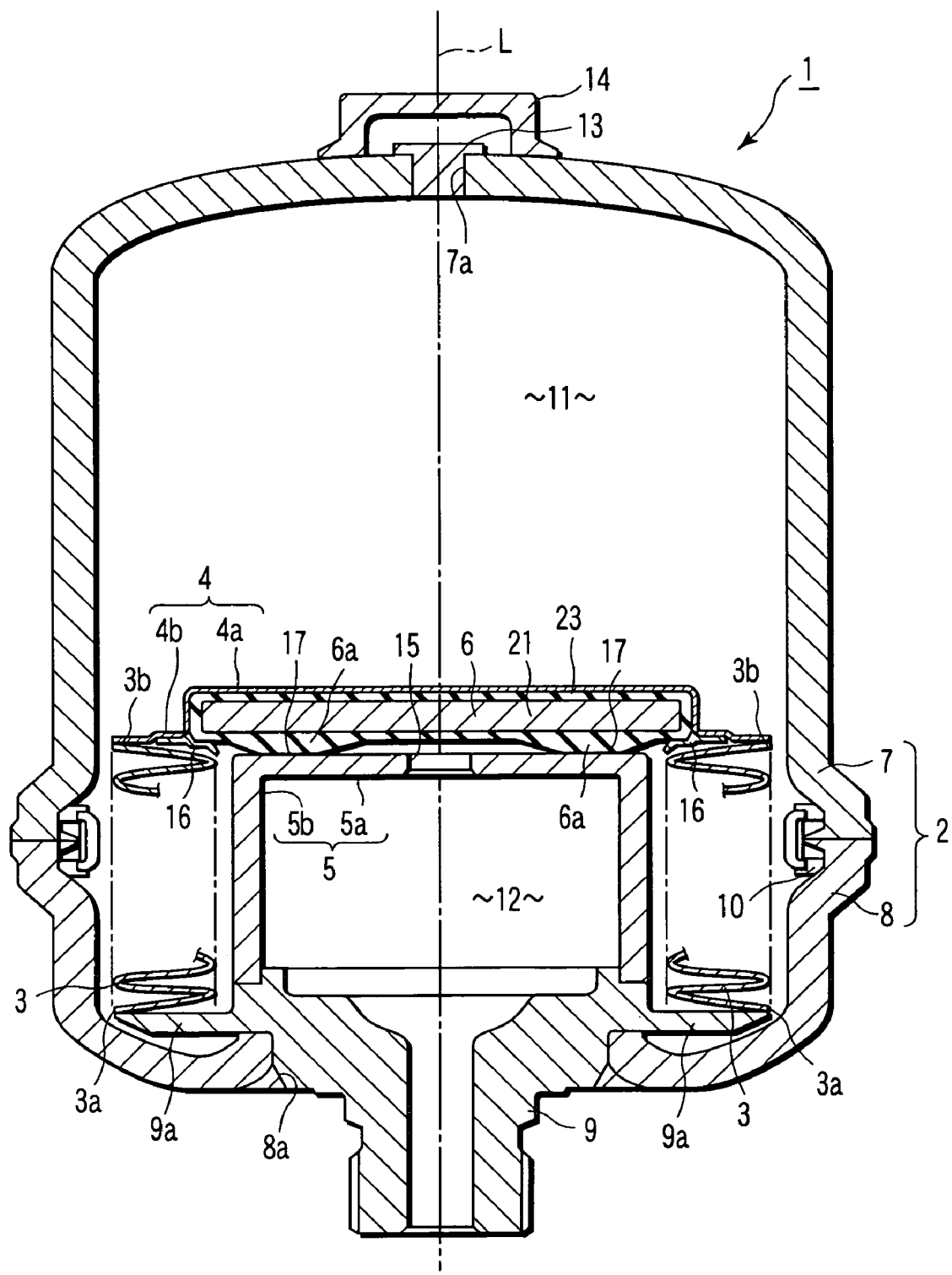
FIG. 1 is a sectional view showing an accumulator as a vehicular brake system component according to a first embodiment of the invention.
Figure 2:
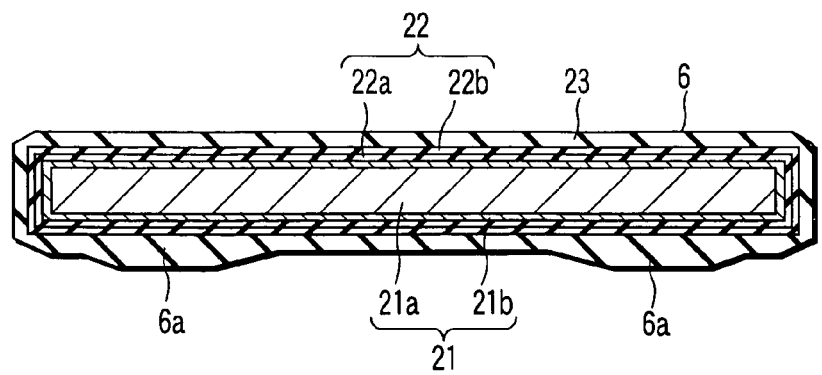
FIG. 2 is a sectional view showing a seal member of the accumulator of FIG. 1.

As shown in FIG. 1, an accumulator 1 as a vehicular brake system component comprises a pressure vessel 2, metallic bellows 3 as a diaphragm, cap portion 4, partition wall 5, seal member 6, etc. The seal member 6 serves also as a sealable bonded component.

The accumulator 1 is used to store pressure generated in a hydraulic-pressure device and absorb hydraulic pulsation. In the description of the present embodiment to follow, the accumulator 1 is supposed to be used as the hydraulic-pressure device in a hydraulic brake device as a vehicular brake system that is attached to a vehicle such as an automobile.

The pressure vessel 2 has first and second shells 7 and 8. Each of the first and second shells 7 and 8 is a bottomed cylinder that is formed by forging or the like. The outside and inside diameters of an open end of the first shell 7 are substantially equal to those of an open end of the second shell 8. The first shell 7 has a gas inlet 7a in its bottom portion (upper part in FIG. 1). The second shell 8 has an opening 8a in its bottom portion (lower part in FIG. 1). The second shell 8 also has a port 9 through which a liquid from the brake device is introduced into the vessel. A support collar 9a for fixing a fixed end 3a (mentioned later) of the bellows 3 projects horizontally outward from the port 9. The port 9 is fitted in the opening 8a of the second shell 8 with its support collar 9a held in the shell 8.

The respective end portions of the first and second shells 7 and 8 are resistance-welded with current supplied between them and under pressure in the axial direction of the shells 7 and 8. By doing this, the shells 7 and 8 are joined together in a gastight manner. The pressure vessel 2, which is composed of the first and second shells 7 and 8 joined in this manner, is stiff enough to resist the working pressure of the brake device that acts on the accumulator 1.

The pressure vessel 2 has a gas chamber 11 and a liquid chamber 12 defined therein. The bellows 3 divides the gas chamber 11 and the liquid chamber 12, and is located inside the vessel 2. The bellows 3 has the fixed end 3a fixed to the pressure vessel 2 and a free end 3b that can extend and contract in the direction of an axis L of the vessel 2. The fixed end 3a of the bellows 3 is bonded to the whole circumference of the support collar 9a in an air- and liquid-tight manner by welding or the like. The cap portion 4 has a flat, bottomed cylinder portion 4a with a low profile and a collar portion 4b that projects horizontally outward from an open end of the cylinder portion 4a. The free end 3b of the bellows 3 is bonded to the whole circumference of the collar portion 4b of the cap portion 4 in an air- and liquid-tight manner by welding or the like.

The interior of the pressure vessel 2, constructed in this manner, is divided in two, the gas chamber 11 and the liquid chamber 12. The gas chamber 11 is surrounded by the outer surface of the bellows 3, the inner surface of the pressure vessel 2, and the outer surface of the cap portion 4 (on the side of the first shell 7). The liquid chamber 12 is surrounded by the inner surface of the bellows 3 and the inner surface of the cap portion 4 (on the side of the second shell 8).

Nitrogen gas or inert gas is sealed into the gas chamber 11 through the gas inlet 7a. After the gas is sealed into the gas chamber 11, the gas inlet 7a is hermetically closed with of a sealing plug 13. In FIG. 1, numeral 14 denotes a cover that encloses the plug 13. The liquid chamber 12 communicates with the brake device by means of the port 9. The interior of the liquid chamber 12 is filled with a liquid or brake fluid that is introduced from the brake device. Thus, the pressure of the brake fluid in the brake device acts on the liquid chamber 12.

The partition wall 5 is provided in the liquid chamber 12. The wall 5 has a disk-shaped end wall 5a, which extends parallel to the base of the cap portion 4, and a cylindrical peripheral wall 5b. The wall 5 divides the interior of the liquid chamber 12 into two regions, a first region that communicates with the brake unit by means of the port 9 and a second region that is surrounded by the inner surface of the bellows 3 and the partition wall 5. The end wall 5a has a circulation port 15 through which the liquid in the liquid chamber 12 flows between the first and second regions.

The seal member 6 for closing the circulation port 15 in a liquid-tight manner is located inside the cap portion 4. The seal member 6 faces the end wall 5a. A ring-shaped retainer plate 16 is attached to the collar portion 4b of the cap portion 4 by spot welding or the like. The retainer plate 16 restrains the seal member 6 from slipping out of the cap portion 4. When the bellows 3 contracts to a given stroke, the seal member 6 is sandwiched between the cap portion 4 and the end wall 5a so that the liquid (brake fluid) is confined between the partition wall 5 (peripheral wall 5b) and the bellows 3 (see FIG. 1).

That part (hereinafter referred to as receiving seat 17) of the end wall 5a which engages the seal member 6 is formed flat. The receiving seat 17 may be minutely roughened to secure a satisfactory sealing effect between the seal member 6 and the seat 17. A protrusion 6a is formed on that part of the seal member 6 which engages the receiving seat 17. This engaging part may be formed flat.

The following is a description of the operation of the accumulator 1.

Before the gas is sealed into the gas chamber 11, the brake fluid is fed in advance from the brake device into the liquid chamber 12 through the port 9. The pressure of the brake fluid causes the bellows 3 to extend, so that the seal member 6 is separated from the receiving seat 17 of the partition wall 5. Thereupon, the circulation port 15 is opened. When the port 15 is open, the gas is fed through the gas inlet 7a into the gas chamber 11.

As the gas is fed in this manner, the bellows 3 is gradually contracted by the pressure of the fed gas, and the seal member 6 engages the receiving seat 17, as shown in FIG. 1. Thereupon, the circulation port 15 is closed. When the port 15 is closed, the spaced surrounded by the bellows 3 and the partition wall 5 is hermetically closed, so that the brake fluid is confined between the bellows 3 and the partition wall 5. The liquid is substantially noncompressive. If the pressure in the gas chamber 11 further increases, therefore, it is received by the brake fluid (backup oil) that is confined between the bellows 3 and the partition wall 5. Thus, any undue force is not liable to act on the bellows 3 locally.

In this manner, the gas is fed into the gas chamber 11 so that the pressure in the chamber 11 reaches a given pressure of, e.g., 20 MPa or more. Thereafter, the gas inlet 7a is hermetically closed with the sealing plug 13.

The pressure inside the partition wall 5 of the liquid chamber 12 acts on the seal member 6 if it increases depending on fluctuation of the liquid pressure in the brake device while the accumulator 1 is working. This pressure presses the seal member 6, whereupon the circulation port 15 opens, and the bellows 3 extends. The bellows 3 extends by a margin corresponding to the pressure in the liquid chamber 12, whereupon the pressures in the liquid chamber 12 and the gas chamber 11 are balanced. If the pressure inside the partition wall 5 of the liquid chamber 12 lowers, the pressure from the gas chamber 11 presses the cap portion 4, whereupon the bellows 3 contracts. The bellows 3 contracts by a margin corresponding to the pressure in the liquid chamber 12, whereupon the pressures in the chambers 12 and 11 are balanced. These processes of operation absorb the fluctuation of the pressure in the brake device.

If the pressure in the liquid chamber 12 lowers to a given or lower pressure, that is, to a level lower than the pressure in the gas chamber 11, the bellows 3 contracts so that the seal member 6 engages the receiving seat 17. Thereupon, the circulation port 15 is closed. When the port 15 is closed, the space surrounded by the bellows 3 and the partition wall 5 is hermetically closed, so that the pressures in the second region of the liquid chamber 12 and the gas chamber 11 are balanced. Thus, the bellows 3 can enjoy improved durability without the possibility of being subjected to an undue local force.

The following is a detailed description of the seal member 6. As shown in FIG. 2, the seal member 6 has a disk-shaped metal member 21, adhesive layer 22, and elastic rubber member 23. The metal member 21 has a metal member body 21a and a protective film 21b. The protective film 21b covers the whole surface of the metal member body 21a and serves to restrain degradation of the body 21a. The adhesive layer 22 is provided covering the whole surface of the metal member 21, that is, the whole surface of the protective film 21b. The elastic rubber member 23 is bonded to the metal member 21 with the adhesive layer 22 between them. In other words, the metal member 21 is covered by the rubber member 23 with the layer 22 between them. For example, EPDM (ethylene-propylene-diene-methylene copolymer) may be suitably used for the rubber member 23.

Figure 3:
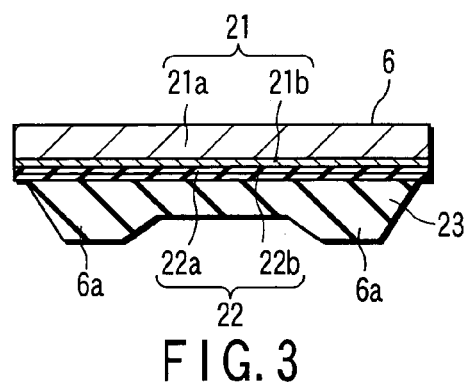
FIG. 3 is a sectional view showing another example of the seal member capable of being attached to the accumulator of FIG. 1.

The protective film 21b need not always cover the whole surface of the metal member body 21a, and must only be located corresponding to at least a part of the surface of the body 21a. As shown in FIG. 3, for example, the protective film 21b may be provided between the metal member body 21a and the adhesive layer 22. The layer 22 and the rubber member 23 need not always cover the whole surface of the metal member 21, and must only be located corresponding to at least a part of the surface of the metal member 21. As shown in FIG. 3, for example, the adhesive layer 22 may be located on one surface of the disk-shaped metal member 21. In this case, the rubber member 23 that has a size corresponding to the one surface of the metal member 21 is bonded to the member 21 with the adhesive layer 22 between them.

The following is a description of the adhesive layer 22. Preferably, the metal member 21 and the elastic rubber member 23 are bonded to each other by vulcanization bonding. According to this method, they are bonded together as the rubber member 23 is molded. More specifically, indirect vulcanization bonding is preferably used such that the adhesive layer 22 is interposed between the rubber member 23 and the metal member 21. By doing this, the two members 21 and 23 can be bonded more securely to each other.

Preferably, the adhesive layer 22 has a first adhesive layer 22a (undercoat or primer) in contact with the metal member 21 (protective film 21b) and a second adhesive layer 22b (topcoat or cover coat) thereon.

A liquid that easily absorbs water, such as ethylene glycol ether, is frequently used as the brake fluid. Accordingly, the adhesive layer 22 must be selected in consideration of its water resistance. Preferably, therefore, the adhesive layer 22 should be maximally cleared of chlorine (Cl), sulfo group ($-SO_3H$), and other ingredients that are relatively chemically unstable. For example, the second adhesive layer 22b should preferably be formed of a resin based on chlorinated EPDM (ethylene-propylene-diene-methylene copolymer), which will be mentioned later. However, many of existing resins that are based on chlorinated EPDM contain 15.0% or more of chlorine or 2.0% or more of the sulfo group by weight. According to the present embodiment, therefore, both the first and second adhesive layers 22a and 22b are cleared of chlorine and the sulfo group so that they contain 11.0% or less of chlorine and 1.0% or less of the sulfo group by weight.

Figure 6:
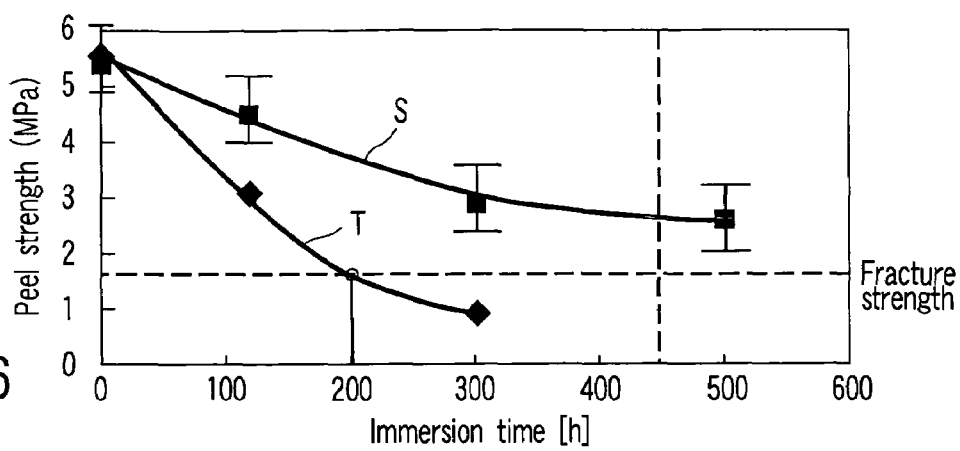
FIG. 6 is a diagram showing the relation between the immersion time of the seal member using an adhesive layer of the first embodiment and the peel strength between a metal member and an elastic rubber member, compared with a seal member using an adhesive layer as a comparative example.

FIG. 6 shows the relation between the immersion time of the seal member 6 and peel strength between the metal member 21 and the elastic rubber member 23. In FIG. 6, curves S and T represent measurement results obtained with use of samples S and T, respectively.

The test was conducted under the following conditions.

Sample S (seal member 6 of the present embodiment): Seal member with a layer of resin based on chlorinated EPDM containing 11.0% or less of chlorine and 1.0% or less of the sulfo group by weight (and sharing other conditions with the seal member 6 of the present embodiment), Sample T (comparative example): Seal member with the adhesive layer 22 containing 15.0% or more of chlorine or 2.0% or more of the sulfo group by weight (and sharing other conditions with the seal member 6 of the present embodiment), Immersion liquid: Brake fluid containing 5% of water by volume, Brake fluid temperature: 120° C.

Figure 4:
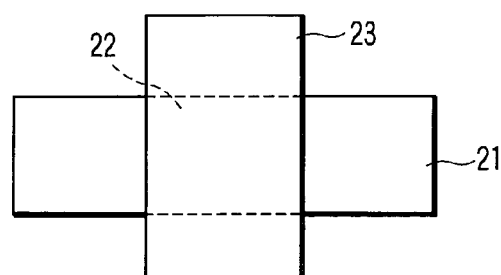
FIG. 4 is a plan view showing a sample used in a peel strength test.
Figure 5:
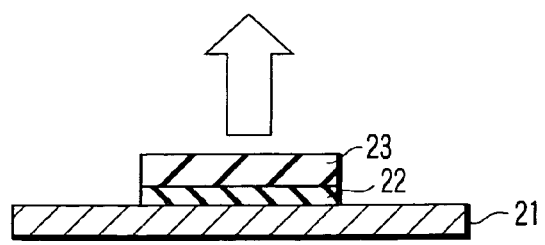
FIG. 5 is a sectional view showing the sample used in the peel strength test.

The following is a description of a method of measuring the peel strength. This peel strength test was conducted on a sample (hereinafter referred to as cross specimen) in which the metal member 21 and the elastic rubber member 23 were joined like a cross with the adhesive layer 22 between them, as shown in FIGS. 4 and 5. The metal member 21 measured 20 mm by 50 mm by 3.2 mm. The rubber member 23 was pulled in the direction opposite from the metal member 21 at the rate of 10 mm/min in an atmosphere of 120° C.

It was confirmed by the inventors hereof that when the peel strength of the seal member 6 lowered, the sealing performance of the seal member 6 lowered so that the brake fluid (backup oil) failed to be satisfactorily confined between the bellows 3 and the partition wall 5. It was also confirmed that the sealing performance of the seal member 6 was easily spoiled when its peel strength lowered to 32% or less of its initial value. In FIG. 6, a fracture strength is represented as a point at which the peel strength between the metal member 21 and the elastic rubber member 23 is 32% of its initial value.

In the case of the sample T (comparative example), the peel strength was about 3 MPa after 100 hours of the immersion time and fell below the fracture strength when the immersion time lasted about 200 hours.

In the case of the sample S (seal member 6 of the present embodiment), on the other hand, the peel strength was about 3 MPa after 300 hours of the immersion time and kept at about 2.5 MPa without falling below the fracture strength even after 500 hours of the immersion time. Thereafter, the peel strength lowered more slowly, and the strength of adhesion between the metal member 21 and the elastic rubber member 23 was kept at 40% or more of the initial peel strength after 300 hours of the immersion time.

The adhesion between the metal member 21 and the elastic rubber member 23 can be improved by using, for the first and second adhesive layers 22a and 22b, adhesives that are highly cohesive to the metal member 21 (protective film 21b and metal member body 21a) and the elastic rubber member 23, respectively.

Preferably, a polar resin that can adhere to the metal member 21 is used for the first adhesive layer 22a (primer). More preferably, the first adhesive layer 22a should be formed of an adhesive that is highly cohesive to the protective film 21b or the metal member body 21a and has outstanding heat resistance and chemical resistance. For example, phenol resin, epoxy resin, etc. may be used for the adhesive layer 22a.

The second adhesive layer 22b (cover coat) serves to bond a relatively rigid resin for the first adhesive layer 22a to the elastic rubber member 23 that is formed of soft rubber or elastomer. Therefore, an elastic body that is based on rubber or elastomer is suited for the second adhesive layer 22b.

Preferably, moreover, an adhesive that is compatible with the elastic rubber member 23 should be selected as the second adhesive layer 22b. For example, a layer of a copolymer that consists mainly of ethylene, propylene, diene, and methylene may be used as the adhesive layer 22.

Preferably, furthermore, the second adhesive layer 22b should be adhesive to both the elastic rubber member 23 and the polar resin (e.g., phenol or epoxy resin) that is suited for the first adhesive layer 22a. In other words, the adhesive layer 22b should have affinity with both the first adhesive layer 22a and the rubber member 23.

A solubility parameter (SP value) is a known index that indicates the affinity of two ingredients. The SP value is defined as the square root of necessary energy per unit volume (cohesive energy density) for the separation of one molecule from an aggregate of molecules of each ingredient. Thus, ingredients that have approximate SP values enjoy good affinity and wettability with each other. Table 1 shows the respective SP values of various synthetic rubbers, brake fluid (e.g., polyethylene glycol), and water. The SP values of chlorinated EPDM and chlorinated polyethylene vary depending on their rates of chlorination.

TABLE 1

SP values of various synthetic rubbers

| Type of rubber | SP value |
|---|---|
| Ethylene-propylenen rubber | 7.9 |
| Chlorinated EPDM (C1) | 8.3-9.3 |
| Chlorinated polyethylene rubber (C0) | 8.2-9.0 |
| Hydrine rubber | 9.1 |
| Chloroprene rubber | 9.2 |
| Acrylic rubber | 9.4 |
| Nitrile rubber | 9.6 |
| Urethane rubber | 10.0 |
| Brake fluid (polyethylene glycol) | 14.6 |
| Water | 23.4 |

As described above, EPDM (ethylene-propylene-diene-methylene copolymer) may be suitably used for the elastic rubber member 23, for example. Therefore, the second adhesive layer 22b may suitably be formed of, for example, an ingredient with an SP value that is intermediate between that (11.3) of phenol resin, which is suited for the first adhesive layer 22a, and that (7.9) of EPDM, which is suited for the rubber member 23. Thus, chlorinated EPDM resin (or chlorinated EPDM rubber), chlorinated polyethylene resin (chlorinated polyethylene rubber), etc. may be suitably used for the second adhesive layer 22b. If EPDM is used for the rubber member 23, chlorinated EPDM of which the chemical structure resembles that of EPDM may be supposed to be more preferable. If the chlorinated EPDM or polyethylene resin is used for the second adhesive layer 22b, however, the respective thicknesses of the first and second adhesive layers 22a and 22b should preferably be selected in the following manner, in order to compensate for the adhesion with the first adhesive layer 22a.

The following is a description of results of examinations on the thicknesses of the first and second adhesive layers 22a and 22b. Table 2 shows results of evaluations on the thicknesses and the coating conditions of adhesives. Table 3 shows measurement results on the peel strength after immersion tests using cross specimens. Table 4 shows test results on the states of peeling after the immersion tests using the cross specimens. Table 5 shows the peel strength remaining rate (the rate of peel strength retention) after the immersion tests using the cross specimens. The peel strength was measured under the same conditions as aforesaid.

TABLE 2

Adhesive film thickness and coating conditions
(conditions of primer and cover coat shown in the order named in each column,
○: good, X: too uneven for use)

| | | Typical film thickness | Film thickness range | Primer Typical film thickness | | | | | | |
|---|---|---|---|---|---|---|---|---|---|---|
| | | | | 0.5 μm <1 μm | 2 μm 1-3 μm | 4 μm 3-5 μm | 7 μm 6-8 μm | 10 μm 9-11 μm | 14 μm 13-15 μm | 17 μm 16-24 μm |
| Cover coat | | 2 μm | 1-4 μm | X, X | ○, X | ○, X | ○, X | ○, X | ○, X | X, X |
| | | 5 μm | 4-6 μm | X, ○ | ○, ○ | ○, ○ | ○, ○ | ○, ○ | ○, ○ | X, ○ |
| | | 8 μm | 7-9 μm | X, ○ | ○, ○ | ○, ○ | ○, ○ | ○, ○ | ○, ○ | X, ○ |
| | | 10 μm | 9-11 μm | X, ○ | ○, ○ | ○, ○ | ○, ○ | ○, ○ | ○, ○ | X, ○ |
| | | 15 μm | 14-16 μm | X, ○ | ○, ○ | ○, ○ | ○, ○ | ○, ○ | ○, ○ | X, ○ |
| | | 20 μm | 19-21 μm | X, ○ | ○, ○ | ○, ○ | ○, ○ | ○, ○ | ○, ○ | X, ○ |
| | | 25 μm | 22-28 μm | X, X | ○, X | ○, X | ○, X | ○, X | ○, X | X, X |

TABLE 3

Peel strength after immersion test based on cross specimens

| | | Typical film thickness | Film thickness range | Primer Typical film thickness | | | | | | |
|---|---|---|---|---|---|---|---|---|---|---|
| | | | | 0.5 μm <1 μm | 2 μm 1-3 μm | 4 μm 3-5 μm | 7 μm 6-8 μm | 10 μm 9-11 μm | 14 μm 13-15 μm | 17 μm 16-24 μm |
| Cover coat | | 2 μm | 1-4 μm | Untestable | Untestable | Untestable | Untestable | Untestable | Untestable | Untestable |
| | | 5 μm | 4-6 μm | Untestable | 5.5 | 5.7 | 5.7 | 5.4 | 4.5 | Untestable |
| | | 8 μm | 7-9 μm | Untestable | 5.3 | 5.8 | 5.6 | 5.7 | 3.1 | Untestable |
| | | 10 μm | 9-11 μm | Untestable | 5.2 | 5.4 | 5.7 | 5.1 | 2.7 | Untestable |
| | | 15 μm | 14-16 μm | Untestable | 2.8 | 3.9 | 3.7 | 3.9 | 2.7 | Untestable |
| | | 20 μm | 19-21 μm | Untestable | 3.0 | 3.5 | 4.5 | 3.7 | 3.4 | Untestable |
| | | 25 μm | 22-28 μm | Untestable | Untestable | Untestable | Untestable | Untestable | Untestable | Untestable |

(12° C. × 10 MPa × 150 h, brake fluid plus 20% of water by weight)

TABLE 4

State of peeling after immersion test based on cross specimens (rate of R-R fracture)

|  | Typical film thickness | Film thickness range | Primer Typical film thickness | | | | | | |
|---|---|---|---|---|---|---|---|---|---|
|  |  |  | 0.5 μm <1 μm | 2 μm 1-3 μm | 4 μm 3-5 μm | 7 μm 6-8 μm | 10 μm 9-11 μm | 14 μm 13-15 μm | 17 μm 16-24 μm |
| Cover coat | 2 μm | 1-4 μm | Untestable | Untestable | Untestable | Untestable | Untestable | Untestable | Untestable |
|  | 5 μm | 4-6 μm | Untestable | 100 | 100 | 100 | 100 | 50 | Untestable |
|  | 8 μm | 7-9 μm | Untestable | 100 | 100 | 100 | 100 | 50 | Untestable |
|  | 10 μm | 9-11 μm | Untestable | 100 | 100 | 100 | 100 | 50 | Untestable |
|  | 15 μm | 14-16 μm | Untestable | 60 | 60 | 60 | 60 | 50 | Untestable |
|  | 20 μm | 19-21 μm | Untestable | 60 | 60 | 60 | 60 | 50 | Untestable |
|  | 25 μm | 22-28 μm | Untestable | Untestable | Untestable | Untestable | Untestable | Untestable | Untestable |

(120° C. × 10 MPa × 150 h, brake fluid plus 20% of water by weight)

TABLE 5

Peel strength rubber remaining rate after immersion test based on cross specimens (not immersed = 100)
(brake fluid plus 20% of water by weight, 120° C. × 10 MPa × 150 h)

|  | Typical film thickness | Film thickness range | Primer film thickness Typical film thickness | | | | | | |
|---|---|---|---|---|---|---|---|---|---|
|  |  |  | 0.5 μm <1 μm | 2 μm 1-3 μm | 4 μm 3-5 μm | 7 μm 6-8 μm | 10 μm 9-11 μm | 14 μm 13-15 μm | 17 μm 16-24 μm |
| Cover coat | 2 μm | 1-4 μm | Untestable | Untestable | Untestable | Untestable | Untestable | Untestable | Untestable |
|  | 5 μm | 4-6 μm | Untestable | 95 | 100 | 100 | 95 | 80 | Untestable |
|  | 8 μm | 7-9 μm | Untestable | 90 | 100 | 100 | 100 | 55 | Untestable |
|  | 10 μm | 9-11 μm | Untestable | 90 | 95 | 100 | 90 | 50 | Untestable |
|  | 15 μm | 14-16 μm | Untestable | 50 | 70 | 65 | 70 | 50 | Untestable |
|  | 20 μm | 19-21 μm | Untestable | 50 | 60 | 75 | 65 | 60 | Untestable |
|  | 25 μm | 22-28 μm | Untestable | Untestable | Untestable | Untestable | Untestable | Untestable | Untestable |

In the immersion test, each sample was immersed in an immersion liquid that consists of polyethylene (brake fluid) and 20% of water by weight at 120° C. and 10 MPa for 150 hours. In Table 4, R-R fracture indicates rubber-to-rubber surface fracture. The higher the rate of rubber-to-rubber surface fracture, the better the adhesion between the metal member 21 and the elastic rubber member 23 can be said to be. Thus, the lower the rate of fracture at the interface between the metal member 21 and the first adhesive layer 22a (or the less the exposure of the metal member 21 at the time of fracture), the better the adhesion between the metal member 21 and the rubber member 23 can be said to be.

If the thickness of the first adhesive layer 22a (primer) exceeds 15 μm, as shown in Table 2, it is hard to apply the adhesive uniformly. If the thickness of the adhesive layer 22a is less than 1 μm, on the other hand, the peel strength lowers to be untestable, as shown in Table 3, and the rate of R-R fracture lowers to be untestable, as shown in Table 4. If the thickness of the adhesive layer 22a is less than 1 μm, moreover, the peel strength rubber remaining rate also lowers to be untestable, as shown in Table 5. Thus, the first adhesive layer 22a is supposed to become fragile if the layer or film thickness is less than 1 μm.

If the thickness of the second adhesive layer 22b (cover coat) exceeds 21 μm, as shown in Table 2, it is hard to apply the adhesive uniformly. If the thickness of the adhesive layer 22b is less than 4 μm, on the other hand, the peel strength lowers to be untestable, as shown in Table 3, and the rate of R-R fracture lowers to be untestable, as shown in Table 4. If the thickness of the adhesive layer 22b is less than 4 μm, moreover, the peel strength remaining rate also lowers to be untestable, as shown in Table 5. Thus, the second adhesive layer 22b is supposed to become fragile if the film thickness is less than 4 μm.

The inventors hereof found that the adhesive layer 22 of the accumulator 1 used in the brake device enjoyed satisfactory adhesion when the peel strength remaining rate was 32% or more. It was found, as shown in Table 5, that the first adhesive layer 22a exhibited good adhesion when its thickness ranged from 1 μm to 15 μm. The second adhesive layer 22b was found to display good adhesion when its thickness ranged from 4 μm to 21 μm.

Further, the adhesion between a metal and an organic adhesive is believed to depend greatly on hydrogen bonds that are formed between a hydroxyl group or carboxyl group on the surface of the metal and a polar group (hydroxyl group, carboxyl group, etc.) in the adhesive. Table 6 shows measurement results on the relation between the hydroxyl group content in the first adhesive layer 22a and the peel strength after the immersion test. The hydroxyl group content was calculated from the content of an ingredient that contains the hydroxyl group by making a gas chromatography (GC-MS) analysis under the following conditions with use of a sample that was obtained by drying the first adhesive layer 22a shown in Table 6 on a stainless-steel sheet at room temperature for 24 hours.

Devices used:
GC: 5890 (HP),
MS: 5971 (HP),
Pyrolyzer: PY-2010D (FRONTIER LAB),
Carrier gas: He,
Measuring temperature:
Pyrolysis temperature: 100° C. to 550° C.,
CG: 50° C. to 300° C.

TABLE 6

Peel strength retention (%) after immersion (based on the strength
(100%) of the non-immersed) (brake fluid plus 5% of water by weight,
120° C. × 10.5 MPa × 300 h)

|  |  |  | Cover coat (Second adhesive layer) | |
|---|---|---|---|---|
|  |  |  | C0<br>Main ingredient:<br>chlorinated<br>polyethylene rubber<br>Chlorine content: 15%<br>or more by weight<br>Sulfo group content:<br>2.0% or more by weight<br>SP value = 8.2-9.0 | C1<br>Main ingredient:<br>chlorinated EPDM<br>Chlorine content: 11.0%<br>or less by weight<br>Sulfo group content:<br>1.0% or less by weight<br>SP value = 8.3-9.3 |
| Primer<br>(First<br>adhesive<br>layer) | P0 | Hydroxyl group content of 15% by weight | 40 | 63 |
|  | P1 | Hydroxyl group content of 14% by weight | 39 | 59 |
|  | P2 | Hydroxyl group content of 10% by weight | 34 | 55 |
|  | p3 | Hydroxyl group content of 8% by weight | 30 | 28 |
|  | P4 | Hydroxyl group content of 1% by weight | 10 | untested |

The hydroxyl group content in the first adhesive layer 22a serves as an index of the number of hydrogen bonds that are formed between the first adhesive layer 22a and the metal member 21. It was confirmed that satisfactory peel strength can be maintained even after the immersion test if the weight ratio of the hydroxyl group in the first adhesive layer 22a is 10% or more, as shown in Table 6. The measurement results of Table 6 indicate, moreover, that the rate of adhesion retention of C1, which consists mainly of chlorinated EPDM, is higher than that of C0, which consists mainly of chlorinated polyethylene rubber. Further, the measurement results of Table 6 indicate that a better peel strength can be maintained by selecting chlorinated EPDM for the second adhesive layer 22b such that the weight ratios of chlorine and the sulfo group therein are 11.0% or less and 1.0% or less, respectively. These results agree with the measurement results shown in FIG. 6.

Based on these results, a phenol resin layer is preferred, for example, as the first adhesive layer 22a. Preferably, its thickness should be adjusted within the range of 1 μm to 15 μm. This is because the phenol resin layer cannot be uniformly spread with ease if its thickness is less than 1 μm, and because it is fragile if its thickness exceeds 15 μm. If the phenol resin layer is fragile, having its thickness more than 15 μm, it is easily broken when the accumulator 1 is subjected to a mechanical input from the brake device. It is difficult for the seal member 6, therefore, to maintain its sealing performance for a prolonged time.

On the other hand, a chlorinated EPDM (ethylene-propylene-diene-methylene copolymer) resin layer is preferred as the second adhesive layer 22b. Preferably, its thickness should be adjusted within the range of 4 μm to 21 μm. This is because the chlorinated EPDM resin layer cannot be uniformly spread with ease if its thickness is less than 4 μm, and because it is fragile if its thickness exceeds 21 μm. If the chlorinated EPDM resin layer is fragile, having its thickness more than 21 μm, it is easily broken when the accumulator 1 is subjected to a mechanical input from the brake device. It is difficult for the seal member 6, therefore, to maintain its sealing performance for a prolonged time.

Thus, the adhesive layer 22 has a double-layer structure, including the first adhesive layer 22a, which is formed of the phenol resin layer with the thickness of 1 μm to 15 μm, and the second adhesive layer 22b, which is formed of the chlorinated EPDM resin layer with the thickness of 4 μm to 21 μm. Further, the weight ratios of chlorine and the sulfo group in the adhesive layers are 11.0% or less and 1.0% or less, respectively, and the hydroxyl group content in the first adhesive layer 22a is adjusted to 10% or more by weight. If the seal member 6 is immersed in the brake fluid, therefore, the peel strength between the metal member 21 and the elastic rubber member 23 can be kept satisfactory for a prolonged time. Thus, according to the accumulator 1 of the present embodiment, the seal member 6 can enjoy good sealing performance for a long period of time.

The following is a description of the elastic rubber member 23. Preferably, the rubber member 23 should be formed of elastic rubber having a hardness of SHORE A 80 as specified by JIS K6253 and a tensile strength of 20 MPa or more. In the present embodiment, elastic rubber having the properties shown in Table 7 is used for the rubber member 23.

TABLE 7

| Physical properties | | Prior art | Embodiment | Testing conditions |
|---|---|---|---|---|
| Original state | Hardness [SHORE A] | 80 | 89 | JIS K 6253 |
|  | Tensile strength [MPa] | 13.0 | 22.8 | JIS K 6251<br>Tensite Speed:<br>500 mm/min. |
|  | Elongation [%] | 100 | 160 |  |
| Thermal aging resistance | Hardness change [Pts] | +3 | ±0 | JIS K 6257,<br>120° C. × 72 h,<br>in air |
|  | Tensile strength changing rate [%] | ±3 | +6 |  |
|  | Elongation changing rate [%] | ±0 | ±0 |  |
| Resistance to brake fluid (5% | Hardness change [Pts] | −10 | −4 | JIS K 6258<br>Brake fluid<br>120° C. × 72 h |
|  | Tensile strength | −11 | −3 |  |

TABLE 7-continued

| Physical properties | | Prior art | Embodiment | Testing conditions |
|---|---|---|---|---|
| of water by volume) | changing rate [%] | | | |
| | Elongation changing rate [%] | +2 | ±0 | |
| | Volume changing rate [%] | +3.0 | +3.0 | |

Table 7 shows properties of the elastic rubber member 23 of the seal member 6 according to the present embodiment, compared with those of elastic rubber that forms a conventional seal member as a comparative example. With use of the elastic rubber member of the seal member that is formed of the elastic rubber of the comparative example, the sealing performance of the accumulator 1 was spoiled early when it was repeatedly strained at 21 MPa and 0 MPa in a brake fluid of 100° C. or more. In the case of the seal member 6 that uses the elastic rubber member 23 of the present embodiment, on the other hand, it was confirmed that satisfactory sealing performance was able to be secured for a prolonged time.

If the pressure in the liquid chamber 12 falls below a given level, a shear strain of about 0.5 is applied between the metal member 21 and the elastic rubber member 23. The highest shear strain is applied to a region near the root of the protrusion 6a, and its magnitude is about 0.7.

The seal member of which the elastic rubber member is formed of the elastic rubber of the comparative example was broken when it was subjected to a mechanical input (repeated strain of 0.5 (0.7 at the maximum)) in a brake fluid of 100° C. It was confirmed, on the other hand, that the seal member 6 using the elastic rubber member 23 of the present embodiment was not broken when it was subjected to a mechanical input (repeated strain of 0.5 (0.7 at the maximum)) in a brake fluid of 120° C.

Further, the seal members 6 were fabricated using materials A to E with varied tensile strengths and rubber hardnesses as the elastic rubber member 23. Relations between the tensile strength, rubber hardness, and frequency of loading to cause fracture were measured by conducting tests in which the seal members 6 were repeatedly strained at 21 MPa and 0 MPa in a brake fluid of 100° C. or more. Table 8 shows results of the measurement.

TABLE 8

| Material | Tensile strength [MPa] | Rubber hardness (JIS A) | Frequency of loading to cause fracture (1,000 or less omitted) |
|---|---|---|---|
| A | 13.0 | 81 | 6,000 |
| B | 18.8 | 82 | 8,000 |
| C | 20.4 | 78 | 15,000 |
| D | 20.5 | 82 | 35,000 or more |
| E | 22.8 | 89 | 35,000 or more |

As shown in Table 8, it was confirmed that satisfactory sealing performance was able to be secured for a prolonged time when any of the materials having the tensile strength of 20 MPa or more and rubber hardness of 80 or more was used for the elastic rubber member 23.

The following is a description of the metal member 21. The metal member body 21a may be formed of mild steel material (SPCC), for example. The surface of mild steel is easily corroded by the influence of water and the like. If the surface of the metal member body 21a is corroded, the metal member 21 is degraded by oxidation, and the function of adhesion between the metal member 21 and the elastic rubber member 23 lowers. Preferably, therefore, the metal member body 21a should be coated with the protective film 21b that is formed of a phosphate film, e.g., a zinc calcium phosphate film. More preferably, the zinc calcium phosphate film, if used as the protective film 21b, should have a crystal grain size of 8 μm or less. If the crystal grain size of zinc calcium phosphate exceeds 8 μm, cracks are easily formed between crystals. Thus, the zinc calcium phosphate film becomes so fragile that it is difficult for the seal member 6 to secure its sealing performance for a prolonged time. Table 9 shows the relation between the calcium phosphate crystal grain size and adhesive force.

TABLE 9

Zinc calcium phosphate crystal grain size and adhesive force

| | | Zinc calcium phosphate crystal grain size [μm] (average diameter) | | |
|---|---|---|---|---|
| | | 2-6 | 4-8 | 8-12 |
| Peel strength of cross specimen [MPa] | Initial stage | 5.7 | 5.8 | 5.6 |
| | After immersion test (brake fluid plus 5% of water by weight, 120° C. × 10 MPa × 150 h) | 5.4 | 5.6 | 5.7 |
| Pliers peel (rate of R-R fracture) | | 95% or more | 95% or more | R-R 60% M-C 40% |

(M-C: near primer-treated surface)

As shown in Table 9, it was found that the pliers peel strength lowered to induce peeling at the interface between the metal member body 21a and the first adhesive layer 22a when zinc calcium phosphate with the grain size of more than 8 μm was used for the protective film 21b. On the other hand, it was found that use of zinc calcium phosphate with the grain size of more than 8 μm was used for the protective film 21b. On the other hand, it was found that use of zinc calcium phosphate with the grain size of 8 μm or less for the protective film 21b was able to maintain satisfactory peel strength despite the application of a large-displacement deformation mode, such as the pliers peel strength.

The protective film 21b is not limited to a phosphate film such as the zinc calcium phosphate film, and may alternatively be a film that is formed by plating or chromite treatment. With this arrangement, the protective film 21b can also restrain corrosion of the metal member body 21a.

Further, the inventors hereof ascertained that if the metal member body 21a is corroded, water or the like may possibly penetrate between the metal member 21 and the elastic rubber member 23, thereby lowering the peel strength. According to the present embodiment, the metal member body 21a can be restrained from being corroded, so that the peel strength between the metal member 21 and the rubber member 23 can be kept satisfactory for a prolonged time. Thus, the seal member 6 can enjoy good sealing performance for a long period of time.

Figure 7:
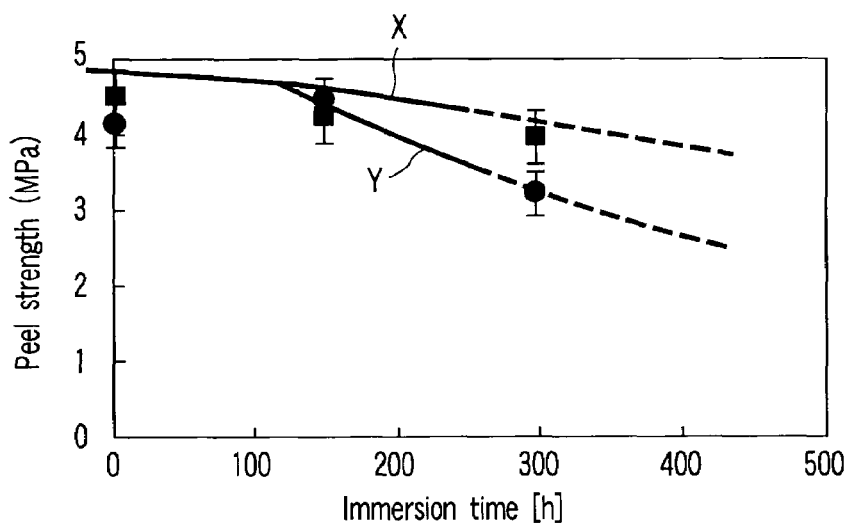
FIG. 7 is a diagram showing the relation between the immersion time of the seal member using a metallic material of the first embodiment and peel strength between a metal member and an elastic rubber member, compared with a seal member using a metallic material as a comparative example.

FIG. 7 shows the relation between the immersion time of the seal member 6 and peel strength between the metal member 21 and the elastic rubber member 23. In FIG. 7, curves X and Y represent measurement results obtained with use of samples X and Y, respectively.

The test was conducted under the following conditions.

Sample X (seal member 6 of the present embodiment): Seal member with the metal member 21 formed of a mild steel sheet having thereon a zinc calcium phosphate film such that the crystal grain size is 8 μm or less (and sharing other conditions with the seal member 6 of the present embodiment), Sample Y (comparative example): Seal member with the metal member 21 formed of a mild steel sheet having a blasted surface (and sharing other conditions with the seal member 6 of the present embodiment), Immersion liquid: Brake fluid containing 5% of water by volume, Brake fluid temperature: 120° C., Pressure applied to seal member 6 (equivalent to differential pressure between gas and liquid chambers): 10.2 MPa, Peel strength measuring method: Same as aforesaid.

When the immersion time was about 200 hours, the difference in peel strength between the samples X and Y was small. When the immersion time was extended to about 300 hours, the peel strength of the sample Y lowered to 3 MPa or thereabout. On the other hand, the peel strength of the sample X was found to be at a satisfactory level of about 4 MPa.

Thus, the zinc calcium phosphate film with the crystal grain size of 8 μm or less is used as the protective film 21b. If the seal member 6 is immersed in the brake fluid, in this case, the peel strength between the metal member 21 and the elastic rubber member 23 can be kept satisfactory for a prolonged time, so that the seal member 6 can enjoy good sealing performance for a long period of time.

If the differential pressure between the gas chamber 11 and the liquid chamber 12 is increased, according to the accumulator 1 of the present embodiment described above, the brake fluid (backup oil) can be is confined between the bellows 3 and the partition wall 5. Thus, there is no possibility of any undue force locally acting on the bellows 3.

Besides, the seal member 6 can secure its sealing performance for a prolonged time even at high temperature (120° C. or more) and under high pressure (10 MPa or more). If the seal member 6 is applied to the brake device or any other hydraulic-pressure device that is subjected to such high temperature and pressure therefore, it can maintain the sealing performance for a long period of time.

Since the sealing performance of the seal member 6 can be secured for a prolonged time, moreover, the bellows 3 can be used as a diaphragm if it is relatively low in pressure resistance.

According to the accumulator 1 for use as the vehicular brake system component of the present embodiment, therefore, the sealing performance can be secured for a prolonged time.

According to the present embodiment, moreover, the accumulator 1 has been described as being applied to the brake device. However, the accumulator 1 of the present embodiment is not limited to the brake fluid, and may be applied in common to various hydraulic fluids, such as general action oil, gasoline, light oil, etc., without failing to enjoy satisfactory durability for a prolonged time. Thus, there is no need of any troublesome operation, such as to change the material of the seal member 6 depending on the type of the liquid. Besides, the manufacturing costs can be restrained, since various materials need not be provided corresponding to various action oils.

Although the seal member 6 is attached to the cap portion 4 according to the present embodiment, it must only be designed so as to be able to close the circulation port 15 in a liquid-tight manner when the bellows 3 extends or contracts to the given stroke. Thus, the seal member 6 may be provided on the partition wall 5 (end wall 5a), for example.

Figure 9:
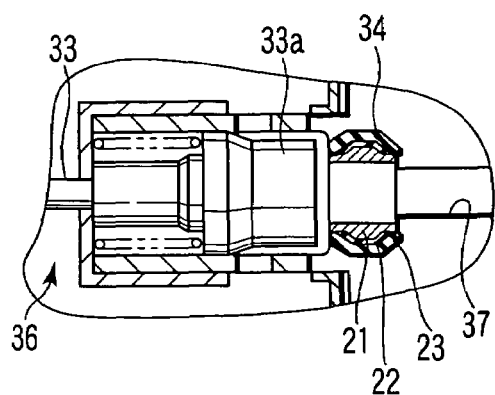
FIG. 9 is an enlarged sectional view showing a center valve of the master cylinder of FIG. 8 and its surroundings.
Figure 10:
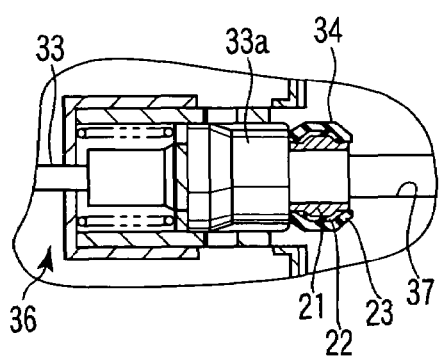
FIG. 10 is a sectional view showing the master cylinder of FIG. 8 with its drain port closed by the center valve.

A second embodiment of the present invention will now be described with reference to FIGS. 8 to 10. In connection with the present embodiment, a master cylinder will be described as an example of the vehicular brake system component. A master cylinder 31 of the present embodiment is constructed in the same manner as an existing master cylinder except for the structure of a center valve 34.

Figure 8:
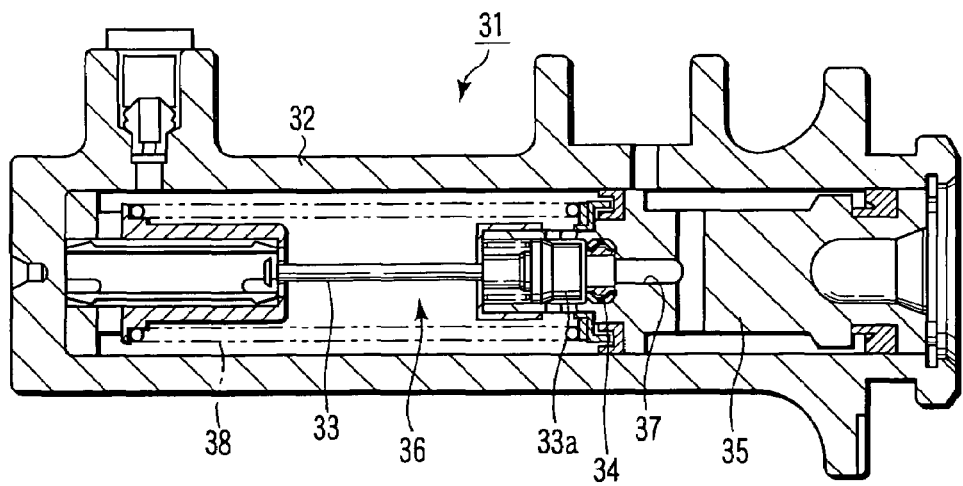
FIG. 8 is a sectional view showing a master cylinder as a vehicular brake system component according to a second embodiment of the invention.

As shown in FIG. 8, the master cylinder 31 is a device that converts an operating force applied to an input mechanism through a brake pedal or the like into a liquid pressure. It comprises a body 32, a rod 33, the center valve 34 for use as a liquid pressure generating mechanism, a piston 35, etc. In the body 32, the rod 33, valve 34, and piston 35 are arranged in the order named. The rod 33 has an abutting portion 33a on the side of the valve 34. The valve 34 is a sealable bonded component that serves also as a seal member. The center valve 34 has a metal member 21, adhesive layer 22, and elastic rubber member 23, and is constructed in the same manner as the seal member 6 of the first embodiment (see FIGS. 9 and 10).

In FIG. 8, numeral 38 denotes a coil spring for use as urging means. The rod 33 and the piston 35 are urged in the direction to move away from each other by the coil spring 38. The piston 35 advances toward the rod 33 as the brake is worked. Further, a liquid chamber 36 and a drain port 37 are arranged in the body 32. When the brake is not being worked, the liquid chamber 36 communicates with the drain port 37 by means of the center valve 34 (see FIG. 9).

The master cylinder 31 acts in the following manner. If the brake is worked, the piston 35 advances toward the rod 33. When the piston 35 advances, the center valve 34 abuts against the abutting portion 33a of the rod 33, thereby closing the drain port 37 (see FIG. 10). Thereupon, the liquid chamber 36 is cut off from the port 37 so that a liquid pressure is generated in the chamber 36. If the brake is released, on the other hand, the rod 33 and the center valve 34 are opened. Thus, the liquid chamber 36 and the drain port 37 communicate with each other, whereupon the chamber 36 is decompressed.

According to the master cylinder 31 for use as the vehicular brake system component of the present embodiment, the center valve 34 is constructed in the same manner as the seal member 6 of the accumulator 1 as the vehicular brake system component of the first embodiment, so that the sealing performance can be secured for a prolonged time.

A third embodiment of the present invention will now be described with reference to FIGS. 11 to 12. In connection with the present embodiment, a plunger pump will be described as an example of the vehicular brake system component. A plunger pump 41 of the present embodiment is constructed in the same manner as an existing plunger pump except for the structure of a seal member 44.

Figure 11:
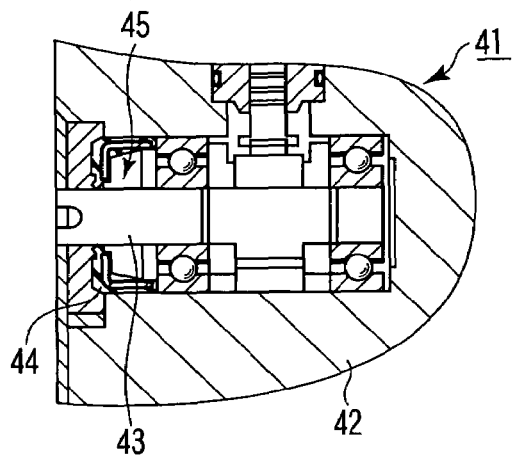
FIG. 11 is a sectional view showing a plunger pump as a vehicular brake system component according to a third embodiment of the invention.
Figure 12:
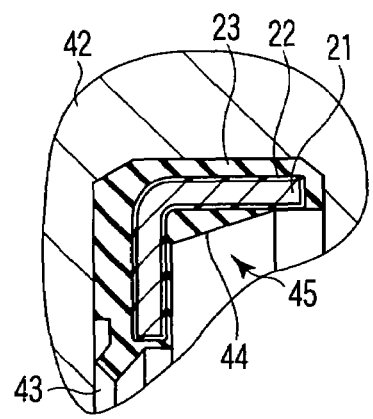
FIG. 12 is an enlarged sectional view showing an oil seal of the plunger pump of FIG. 11 and its surroundings.

As shown in FIG. 11, the plunger pump 41 comprises a body 42, a shaft 43, the seal member 44, etc. The shaft 43 is located in the body 42. Further, a pump suction chamber 45 is defined in the body 42. In the plunger pump 41 that is used as the brake system component, the suction chamber 45 doubles as a cam chamber. The ring-shaped seal member 44 cuts off a brake fluid from the suction chamber 45. The seal member 44 is located along the outer periphery of the shaft 43. The seal member 44 is also a sealable bonded component. It has a metal member 21, adhesive layer 22, and elastic rubber member 23, and is constructed in the same manner as the seal member 6 of the first embodiment (see FIG. 12).

According to the plunger pump 41 for use as the vehicular brake system component of the present embodiment, the seal member 44 constructed in the same manner as the seal member 6 of the accumulator 1 as the vehicular brake system component of the first embodiment, so that the sealing performance can be secured for a prolonged time.

The present invention is not limited to the application to the accumulator, master cylinder, and plunger pump, and may be widely applied to any other vehicular brake system components.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicular brake system component used in a brake system of a vehicle, comprising:
    a pressure vessel having a gas chamber in which a gas is sealed and a liquid chamber adapted to be filled with a liquid;
    a diaphragm, which has a fixed end fixed to the pressure vessel and a free end capable of extending and contracting in a direction of an axis of the pressure vessel, and which is located in the pressure vessel to separate the gas chamber and the liquid chamber;
    a partition wall located in the liquid chamber and having a circulation port through which the liquid in the liquid chamber flows in or out; and
    a seal member which closes the circulation port in a liquid-tight manner to confine the liquid between the partition wall and the diaphragm when the free end of the diaphragm is at a given position;
    wherein the seal member comprises a metal member, an adhesive layer provided on at least a part of the surface of the metal member, and an elastic rubber member bonded to the metal member with the adhesive layer therebetween;
    wherein the metal member comprises a metal member body and a protective film which is provided on a surface of the metal member body and restrains degradation of the metal member body; and
    wherein the protective film is zinc calcium phosphate film having a crystal grain size of 8 μm or less.

2. A vehicular brake system component according to claim 1, wherein the metal member and the elastic rubber member are bonded to each other by vulcanization bonding with use of the adhesive layer.

3. A vehicular brake system component according to claim 1, wherein the adhesive layer comprises a first adhesive layer in contact with the metal member and a second adhesive layer provided on the first adhesive layer.

4. A vehicular brake system component according to claim 3, wherein a weight ratio of a hydroxyl group in the first adhesive layer is 10% or more.

5. A vehicular brake system component according to claim 3, wherein, in the first adhesive layer and the second adhesive layer, weight ratios of chlorine and a sulfo group are 11.0% or less and 1.0% or less, respectively.

6. A vehicular brake system component according to claim 3, wherein a thickness of the first adhesive layer is in a range from 1 μm to 15 μm, and a thickness of the second adhesive layer is in a range from 4 μm to 21 μm.

7. A vehicular brake system component according to claim 3, wherein the first adhesive layer is a phenol resin layer, and the second adhesive layer is a chlorinated EPDM resin layer.

8. A vehicular brake system component according to claim 6, wherein the first adhesive layer is a phenol resin layer, and the second adhesive layer is a chlorinated EPDM resin layer.

9. A vehicular brake system component according to any one of claims 1 and 2 to 8, wherein the elastic rubber member is formed of elastic rubber having a hardness that is higher than SHORE A 80 as specified by JIS K6253 and a tensile strength of 20 MPa or more.

10. A vehicular brake system component according to claim 1, wherein the vehicular brake system component is an accumulator used in the brake system of the vehicle.

* * * * *